United States Patent
Lokhandwala

Patent Number: 5,861,049
Date of Patent: Jan. 19, 1999

[54] CHLORINE SEPARATION PROCESS COMBINING CONDENSATION, MEMBRANE SEPARATION AND FLASH EVAPORATION

[75] Inventor: Kaaeid A. Lokhandwala, Union City, Calif.

[73] Assignee: Membrane Technology and Research, Inc., Menlo Park, Calif.

[21] Appl. No.: 898,566

[22] Filed: Jul. 22, 1997

Related U.S. Application Data

[63] Continuation-in-part of Ser. No. 780,868, Jan. 24, 1997, Pat. No. 5,755,855.

[51] Int. Cl.$^6$ .................................................. B01D 53/22
[52] U.S. Cl. ..................................... 95/39; 95/48; 95/149
[58] Field of Search ............................. 95/39, 45, 48, 95/149, 230, 237

[56] References Cited

U.S. PATENT DOCUMENTS

| | | | |
|---|---|---|---|
| 3,972,691 | 8/1976 | Fukushima et al. | 95/39 |
| 4,548,619 | 10/1985 | Steacy | 423/228 |
| 4,553,983 | 11/1985 | Baker | 55/16 |
| 4,589,896 | 5/1986 | Chen et al. | 68/28 |
| 4,602,477 | 7/1986 | Lucadamo | 62/24 |
| 4,639,257 | 1/1987 | Duckett et al. | 55/16 |
| 4,654,063 | 3/1987 | Auvil et al. | 62/18 |
| 4,661,254 | 4/1987 | Zupancic et al. | 210/490 |
| 4,685,940 | 8/1987 | Soffer et al. | 55/158 |
| 4,885,063 | 12/1989 | Andre | 203/73 |
| 4,906,256 | 3/1990 | Baker et al. | 55/16 |
| 4,913,816 | 4/1990 | Waite | 210/490 |
| 4,941,972 | 7/1990 | Kau et al. | 210/490 |
| 5,013,448 | 5/1991 | Swamikannau | 210/642 |
| 5,064,447 | 11/1991 | Lee | 55/16 |
| 5,071,451 | 12/1991 | Wijmans | 55/16 |
| 5,082,481 | 1/1992 | Barchas et al. | 62/23 |
| 5,089,033 | 2/1992 | Wijmans | 55/16 |
| 5,199,962 | 4/1993 | Wijmans | 95/39 |
| 5,205,843 | 4/1993 | Kaschemekat et al. | 55/16 |
| 5,224,350 | 7/1993 | Mehra | 62/17 |
| 5,256,295 | 10/1993 | Baker et al. | 210/640 |
| 5,256,296 | 10/1993 | Baker et al. | 210/640 |
| 5,332,424 | 7/1994 | Rao et al. | 95/47 |
| 5,374,300 | 12/1994 | Kaschemekat et al. | 95/39 |
| 5,376,164 | 12/1994 | Zarchy et al. | 95/41 |
| 5,414,190 | 5/1995 | Förg et al. | 585/802 |
| 5,452,581 | 9/1995 | Dinh et al. | 62/24 |
| 5,538,535 | 7/1996 | Pinnau et al. | 95/41 |

OTHER PUBLICATIONS

R.W. Baker and M. Jacobs, "Improve Monomer Recovery from Polyolefin Resin Degassing," Hydrocarbon Processing, Mar. 1996.

W.J. Ward et al., "Ultrathin Silicone/Polycarbonate Membranes for Gas Separation Processes," Journ. Memb. Sci., 1, pp. 99–108, 1976.

J.K. Hardy, et al., "A Personal Chlorine Monitor Utilizing Permeation Samples," Environ. Sci. & Tech., 1990.

Primary Examiner—Robert Spitzer
Attorney, Agent, or Firm—J. Farrant

[57] ABSTRACT

A process for separating chlorine from other low-boiling components of a gas-phase mixture. The invention involves three separation steps: condensation, flash evaporation and membrane separation. The steps are integrated together in such a way as to provide a good separation between the components, and to avoid creation of secondary streams that need additional treatment. The invention is particularly useful for treatment of gas streams from chlor-alkali processes.

18 Claims, 4 Drawing Sheets

— 5,861,049 —

CHLORINE SEPARATION PROCESS COMBINING CONDENSATION, MEMBRANE SEPARATION AND FLASH EVAPORATION

This application is a continuation-in-part of application Ser. No. 08/780,868, filed on Jan. 24, 1997 and now U.S. Pat. No. 5,755,855 which is incorporated herein by reference in its entirety.

FIELD OF THE INVENTION

The invention concerns separation of chlorine from gas mixtures. Specifically, the invention concerns such separation by a combination of condensation, flash evaporation and membrane separation.

BACKGROUND OF THE INVENTION

It is frequently the case in the chemical, oil and gas industries, and elsewhere, that a gas-phase mixture that includes one or more relatively low-boiling components has to be separated. In principle, many separation techniques are available, including absorption, adsorption, condensation, cryogenic distillation, membrane separation and so on. The optimum technique depends on the specifics of the situation and is influenced by capital outlay, operating costs, energy consumption, physical and chemical properties of the components, value of the components, environmental protection issues, safety and reliability concerns and other factors.

If the boiling points of the components differ, low-temperature condensation and cryogenic distillation are technically possible, but may be impractical, for example because of high refrigeration costs or the need for extensive pre-treatment to remove components that might freeze and plug the system.

Adsorbents and absorbents are component specific and not infrequently are problematic to regenerate or dispose of.

Membrane separation is currently available only for a limited number of gases and may not be able to produce a product of sufficiently high purity.

Thus, although numerous gas separations are carried out routinely, on a large scale throughout industry, there remains a need for better separation methods, particularly in certain areas.

Chlorine ranks among the ten most important commodity chemicals produced worldwide. The total production of chlorine in the United States in 1991 was reported to be about 14 million tons, almost all of which was produced by the electrolysis of brine. The product of electrolysis is chlorine gas, contaminated with water, hydrogen, air, and other impurities. After the removal of water and other impurities, most chlorine is liquefied by compression and chilling, then sold. As with all compression/condensation processes, it is difficult to recover all the condensable chlorine gas without going to extreme conditions of temperature and pressure. It is not unusual, therefore, for the tail gas from the liquefaction process to contain as much as 40% chlorine by volume.

The presence of hydrogen in the gas stream is an added complication. When hydrogen is present in a gas stream with chlorine or with oxygen at hydrogen concentration less than about 4%, dependent upon pressure and temperature, usually the stream is non-explosive. However, as the hydrogen concentration increases above this lower explosive limit, the reaction on ignition becomes more violent and eventually may reach the detonation stage. To avoid this, the gas stream is routinely diluted with enough air or nitrogen to keep the hydrogen concentration below the 4% limit. Typically such additions are made after condensation steps, where removal of condensable components leaves a higher concentration of hydrogen in the vent stream.

For the past forty years, tail gas has been treated by absorption in carbon tetrachloride. Tail gas from chlorine liquefaction, and other waste streams ("sniff gas") from the plant, are supplied to the carbon tetrachloride absorber under pressure. Chlorine-free (~1 ppm) gas is vented to the atmosphere. The chlorine-rich carbon tetrachloride is fed to a stripper, where chlorine is desorbed and sent to the liquefaction system. The stripped solvent is pumped back to the absorption tower. Approximately 30 lb of carbon tetrachloride per ton of recovered chlorine are lost in this process. It is estimated that 9 million lb of carbon tetrachloride are emitted annually by chlorine liquefaction tail-gas treatment plants. Additional emissions result from similar chlorine absorption processes used in the paper, textile, and polyvinyl chloride industries. Because of the high ozone-depletion potential of carbon tetrachloride, the U.S. Environmental Protection Agency has mandated that these emissions be eliminated, and carbon tetrachloride production has ceased. There is an urgent need, therefore, for alternative treatment technology.

Another source of chlorine-laden gas streams is metal production by electrolysis of the respective molten chlorides, for example, magnesium, calcium, beryllium, and sodium chloride. In all cases, chlorine-containing gas is liberated at the cell anodes; this gas may typically contain as much as 90% chlorine. Other processes that require removal or recovery of chlorine from gas streams include, but are not limited to, production of chlorinated chemicals, bleaching, refrigeration and heat transfer fluids, chlorine transfer and clean-up operations, ore beneficiation, and wastewater treatment.

U.S. Pat. No. 5,538,535, co-owned with the present application, describes a membrane process for separating chlorine from chlorine-containing gas streams.

SUMMARY OF THE INVENTION

As disclosed in parent application Ser. No. 08/780,868, now U.S. Pat. No. 5,755,855, the invention is a process for separating two components of a gaseous mixture, both components having boiling points at 1 atm pressure of about 0° C. or less. The invention involves three separation steps: condensation, flash evaporation and membrane separation. The steps are integrated together in such a way as to provide a good separation between the components, to avoid, as far as possible, creation of secondary streams that need additional treatment, and to be cost- and energy-efficient.

The present invention involves such a process applied to the separation of chlorine from a gas mixture of chlorine and at least one other lower-boiling gas.

In a preferred basic embodiment, the process of the present invention includes the following steps:

(a) compressing the gas mixture;

(b) cooling the gas mixture so that a portion of the mixture condenses, resulting in a chlorine-rich condensed portion and a chlorine-depleted uncondensed portion;

(c) flashing the condensed portion to achieve additional removal of the lower-boiling gas component(s), creating a more enriched chlorine product;

(d) treating the uncondensed portion in a membrane separation unit, containing a membrane selective for chlorine over at least one lower-boiling component, thereby creating a permeate stream enriched in chlorine compared with the uncondensed portion and a residue stream depleted in chlorine compared with the uncondensed portion; and, optionally;

(e) recirculating the permeate stream within the process for additional treatment.

(f) recirculating the flashed gas within the process for additional treatment.

In this way, a better separation result is achieved than would be practically possible with any of the unit separation operations alone. Where recirculation of both the flashed gas and the permeate stream is practiced, the process produces only two streams: the bottom stream from the flash step, which may be drawn off as a liquid or allowed to vaporize; and the purified stream from the membrane separation unit. In some cases, the process may be configured so that the compositions of both of these streams render them suitable for use, reuse or discharge as desired without additional treatment. As a less preferred alternative, it is possible to recirculate the permeate stream, but to send the flashed gas to some other destination or to discharge it. Likewise, it is possible to recirculate the flashed gas, but to send the permeate stream from the membrane unit to some other use or treatment.

In the preferred basic embodiment described above, the condensation step involves both compressing and cooling of the gas mixture. Sometimes the gas stream may already be at high pressure before entering the process, so that chilling but no additional compression is needed to take the stream beyond the dew point and produce partial condensation.

Flash evaporation is generally accomplished by lowering the pressure of the condensate, such as through an expansion valve, but can also be done by raising the condensate temperature, or a combination of pressure release and heating.

The membrane separation step uses a chlorine-selective membrane, for example, of the type taught in U.S. Pat. No. 5,538,535.

All of the unit operations may be performed as single-stage operations, or themselves may be carried out in multiple sub-steps.

In a most preferred embodiment, the process involves the following steps:

(a) compressing the gas mixture to a pressure no higher than about 1,000 psig;

(b) cooling the gas mixture to a temperature no lower than about $-100°$ C.; steps (a) and (b) causing partial condensation of the gas mixture and resulting in a condensed portion enriched in chlorine and an uncondensed portion depleted in chlorine;

(c) flashing the condensed portion to at least partially remove additional amounts of the lower-boiling component as a flash stream, thereby creating a more-enriched chlorine product;

(d) treating the uncondensed portion in a membrane separation unit, containing a membrane selective for chlorine over at least one lower-boiling component, thereby creating a permeate stream enriched in chlorine compared with the uncondensed portion and a residue stream depleted in chlorine compared with the uncondensed portion;

(e) recirculating the permeate stream within the process for additional treatment;

(f) recirculating the flashed gas within the process for additional treatment.

Specific exemplary separations to which the process of the invention can be applied include, but are not limited to, separation of chlorine from other gases as part of the treatment train in a chlorine-production facility; separation of chlorine from other gases during production of metals from their molten chlorides; and production of chlorinated feedstocks, intermediates as products, such as ethylene dichloride.

It is an object of the invention to provide processes for separating gaseous mixtures containing chlorine and other components having boiling points below $0°$ C.

Additional objects and advantages will be apparent from the description of the invention to those skilled in the art.

It is to be understood that the above summary and the following detailed description are intended to explain and illustrate the invention without restricting its scope.

DETAILED DESCRIPTION OF THE INVENTION

Figure 1:
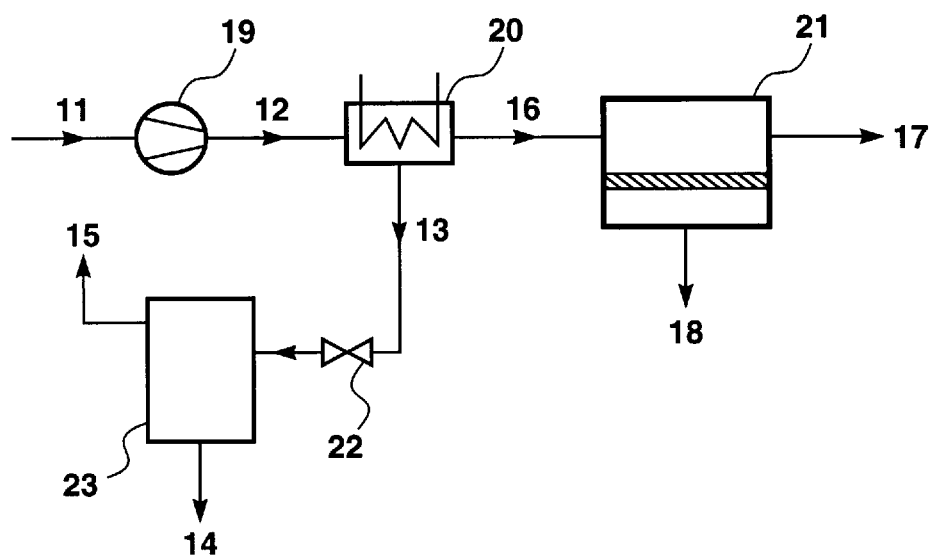
FIG. 1 is a schematic drawing of a basic embodiment of the invention.

The term gas as used herein means a gas or a vapor.

The term $C_{2+}$ hydrocarbon means a hydrocarbon having at least two carbon atoms; the term $C_{3+}$ hydrocarbon means a hydrocarbon having at least three carbon atoms; and so on.

The term light hydrocarbon means a hydrocarbon molecule having no more than about six carbon atoms.

All percentages herein are by volume unless otherwise stated.

As disclosed in parent application Ser. No. 08/780,868, now U.S. Pat. No. 5,755,855, the invention is a process for separating two components of a gaseous mixture, both having boiling points at 1 atm pressure of $0°$ C. or less, the boiling points being different, so that one component is designated the higher-boiling component and the other is designated the lower-boiling component. As disclosed in the parent application, the invention is useful for separating organic/inorganic mixtures, organic mixtures or inorganic mixtures.

The present invention involves such a process applied to the separation of chlorine from one or more lower-boiling components of a gas mixture. The scope of the present invention is not intended to be limited to any particular streams, but to encompass any situation where a gas stream containing chlorine is to be treated to separate chlorine. The feedstreams that can be treated by the process may contain chlorine in admixture with oxygen, nitrogen, carbon dioxide, hydrogen, light hydrocarbons or any other gases, and may contain chlorine and one other component, or chlorine and multiple other components.

The composition of the gas may vary widely, from a mixture that contains just a few percent chlorine to streams that contain larger amounts of chlorine, such as 10%, 20% or 40%, to streams that contain chlorine as the major component, in concentrations even as high as 90% or 95%, for example. Tail gas from chlorine liquefaction plants is a major source of chlorine-containing streams. These plants may produce 100–1,000 scfm tail-gas, which typically contains as much as 40% chlorine. Other streams created during chlorine production, such as those that have not already been subjected to condensation, may contain as much as 90%, 95% or more chlorine. Another source of gas streams with high chlorine content is magnesium production. Magnesium plants can produce streams with flow rates of thousands of scfm, containing 90% chlorine. Large chlorine-contaminated nitrogen streams are also generated in the production of titanium dioxide or titanium metal from titanium tetrachloride produced by chlorination of rutile. Other processes that emit chlorine-containing gas streams suitable for treatment by the process of the invention include production of chlorinated chemicals, bleaching, refrigeration and heat transfer fluids, chlorine transfer and clean-up operations, other ore beneficiation, and wastewater treatment.

The invention involves three separation steps: condensation, flash evaporation and membrane separation.

The goal of the condensation step is to bring the gas stream to a pressure/temperature condition beyond the chlorine dewpoint, so that a portion of chlorine will condense out of the gas stream in liquid form. The amount of chlorine that can be removed from the gas stream in this way depends on the feed composition and the operating conditions under which the condensation is performed.

The condensation step may involve chilling or compression alone, but will usually involve both. Compressing the gas raises the dewpoint temperature, so a combination of compression and chilling is generally preferred. Sometimes, however, the gas stream may already be at high pressure or at low temperature before entering the process, so that only compression or chilling is needed to take the stream beyond the dew point and produce partial condensation.

The condensation step may be carried out in a single stage using a single compression/cooling or cooling step, or in multiple stages using multiple compression steps, multiple cooling steps, or both.

It is desirable to avoid compressing to very high pressures and cooling to very low temperatures, since reaching these conditions requires larger, more powerful compressors and chillers, which adds to the cost and complexity of the process. By very high pressures, we mean pressures in excess of about 1,500 psig. More preferably, the pressure at which the condensation step is operated should be no more than about 1,000 psig, yet more preferably 500 psig, and most preferably no more than about 250 psig, depending on the feed stream being separated. Of course, if the raw stream to be treated is already at high pressure, it is desirable to take advantage of that pressure for the condensation step.

By very low temperatures, we mean temperatures below about −100° C. The temperature at which the condensation step is operated should preferably be in the range 10° C. to −100° C. More preferably, the temperature should be above about −40° C., or in the range 10° C. to −40° C. Temperatures down to about the bottom of this range should be possible to reach by single-stage refrigeration, for example using propane as the cooling refrigerant. Temperatures down to about −65° C. can be reached by tertiary liquefaction. Temperatures above 0° C. can be used with a correspondingly high pressure, such as above 500 psig.

The fraction of chlorine remaining in the condenser vent gas after the condensation step depends on the vapor/liquid equilibrium at the operating conditions under which the condensation step is performed. It is theoretically possible to obtain as much removal as required by creating appropriate conditions of high pressure and low temperature.

In the practice of the invention, however, it is preferable only that the condensation step be designed to remove at least about 50% of the chlorine present in the feed to the condenser, more preferably, at least about 70%. Operation under extreme conditions to achieve 90% or more removal may not be necessary, because the process does not rely on condensation alone to achieve the overall separation. For example, suppose the condensation step removes 50% of the chlorine content of the feed gas. If the condensation step is followed by a membrane separation step that can remove 80% of the chlorine reaching it, then the total removal obtained is 90%. If the condensation step removes 80%, and is followed by a membrane separation step that also removes 80%, then the total removal is 96%. If the condensation step removes 80% and the membrane separation step 90%, the total removal is 98%.

The preferred goal of the process is to separate the gas mixture into only two product streams: the residue stream exiting after the membrane separation step and the chlorine product stream exiting as the bottom stream from the flash evaporation step. Typically, there will be composition targets for each stream. For example, the residue stream might be required to contain no more than 5%, 1%, 500 ppm, 100 ppm or 10 ppm of chlorine, depending on the destination of the stream, and the product stream might be required to contain no more than 5%, 1% or ppm levels of other gases. Depending on the original composition of the mixture, this may mean 50%, 80%, 90%, 99% or 99.9%, for example, removal of chlorine from the raw gas mixture, coupled with 5-fold, 10-fold, 100-fold, 1,000-fold or more enrichment of chlorine in the product stream.

The conditions under which the condensation step is carried out influence the compositions of both the condensed and uncondensed portions. If the condensation conditions are beyond the dewpoint of other gas or gases in the mix, then those components also will start to condense. Even under milder conditions, other gases may dissolve in the liquefying chlorine to some extent, and thus partition into the liquid phase. For both reasons, it is preferable to avoid extremes of pressure and temperature in the condensation step, since these will promote a less-enriched, more contaminated condensate.

Turning now to the flash evaporation step, this may be carried out by any convenient technique. Typically, flashing is achieved by letting down the pressure of the liquid to be flashed, thereby achieving essentially instantaneous conversion of a portion of the liquid to the gas phase. This may be done by passing the liquid through an expansion valve into a receiving tank or chamber, or any other type of phase separation vessel, for example. The released gas can be drawn off from the upper part of the chamber; the remaining liquid can be withdrawn from the bottom. It is often convenient to carry out the flash evaporation by pressure release alone. For example, pressure reduction may be required for other reasons before the condensed product can be transported or stored.

Alternatively, flash evaporation can be achieved by sending the liquid to a vessel and raising the temperature, while maintaining the pressure at its previous value. Using only a temperature change to produce flashing has some advantages, in that the gas released by heating is at a high pressure and can be recirculated back to the feed gas stream or subjected to some other separation step without additional compression. This lowers overall processing costs in some cases. However, much better removal of the lower-boiling point gas is usually obtainable per unit pressure change than per unit temperature change.

As yet another alternative, a combination of pressure lowering and heating can be used. This may be the most efficient technique when it is desired to drive off essentially all of the dissolved gas, for example. Those of skill in the art will appreciate that the decision as to which method to use in any specific set of circumstances should be determined taking into account the environment in which the process is to be carried out, and the relative importance of product purity, operating costs and other factors.

As a general guideline, we favor using pressure reduction, which is simple and reliable.

Whether lowering the pressure or raising the temperature, or both, it is preferred to bring the condensate to a condition just a little beyond the chlorine saturation vapor pressure of the higher-boiling component at that temperature. This prevents loss of the higher-boiling component into the gas phase. By a little above the saturation vapor pressure, we mean most preferably about 0–50 psig above the saturation vapor pressure at the flashing temperature.

The amounts and compositions of the flashed gas and the product liquid depend on the changes of pressure and temperature to which the condensate is subjected. Generally, the results are very close to a theoretical one-stage evaporation step and can be calculated to good reliability from tabulated thermodynamic data.

In basic embodiments of the invention, flash evaporation is carried out in one stage, to produce one flashed gas stream and a residual liquid product. Optionally, flashing may be carried out in two or more stages, such as by lowering the pressure incrementally. This type of operation produces several gas streams at different pressures. By removing at least a portion of the gas at high pressure, the cost of compression of the remainder is reduced. This type of multistage flash evaporation is particularly suited to situations where the condensation pressure is relatively high.

The third unit separation process is membrane separation. The membrane unit contains a chlorine-selective membrane, that is, a membrane that is more permeable to chlorine than to at least one other component of the gas mixture, so that the membrane permeate stream is enriched in chlorine content and the membrane residue stream is depleted in chlorine content compared with the membrane feed stream.

Relatively few membranes are suitable to withstand operation with streams containing chlorine in any significant concentration. Membranes that can be used are taught in U.S. Pat. No. 5,538,535, incorporated herein by reference in its entirety. To summarize the teachings therein, preferred embodiments of the invention employ a thin-film composite membrane comprising a microporous support onto which is coated a selective layer of a rubbery polymer. The microporous support membrane should have a flow resistance that is very small compared to the selective layer. A preferred support membrane is an asymmetric Loeb-Sourirajan type membrane, which consists of a relatively open, porous substrate with a thin, dense, finely porous skin layer. Preferably the pores in the skin layer should be less than 1 micron in diameter, to enable the skin to be coated with a defect-free permselective layer. The support membrane should resist the solvents used in applying the selective layer.

Both the microporous support layer and the selective layer must exhibit long-term stability in the presence of high concentrations of chlorine gas. Many materials commonly used to make membranes are unsuitable.

Suitable materials for forming microporous support membranes include poly(tetrafluoroethylene), poly(vinylidene fluoride), and their copolymers, and other fluorinated, low-reactivity polymers. Poly(vinylidene fluoride) [PVDF] (Kynar® 461, Pennwalt Corp., Philadelphia, Pa.) is a preferred material.

Suitable materials for the selective layer include crosslinked rubbery polymers. Highly-crosslinked silicone rubber is preferred. Other suitable materials, once stabilized by crosslinking, include chlorosulfonated polyethylene (CSE), ethylene-propylene-diene terpolymer (EPD), and ethylene-propylene copolymer (EPM). The preferred method of depositing the selective layer is by dip coating.

To achieve high fluxes, such as at least $1 \times 10^{-6}$ cm$^3$/cm$^2$·s·cmHg, more preferably $1 \times 10^{-5}$ cm$^3$/cm$^2$·s·cmHg, most preferably $1 \times 10^{-4}$ cm$^3$cm$^2$·s·cmHg, the selective layer should preferably be less than 25 $\mu$m thick, and more preferably thinner.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice.

As an alternative to polymer membranes, membranes based on finely microporous carbon, such as the adsorbent carbon membranes described in U.S. Pat. No. 5,332,424, the pyrolysed carbon membranes described in U.S. Pat. No. 4,685,940, or ceramics such as alumina or silica can be used. The pores in these materials have the ability to cause capillary condensation of chlorine at low temperature, and the condensable gas then permeates the membrane by surface diffusion at a rate that is rapid compared to the simple gas-phase diffusion of the non-adsorbed gases.

The membranes should preferably have a selectivity for chlorine over nitrogen of at least about 10, more preferably at least about 20 under the operating conditions of the process. In general, the selectivity of the rubbery materials used improves as the operating temperature is lowered. Thus, the upstream cooling/condensation step tends to facilitate good separation in the membrane step.

A driving force for transmembrane permeation is typically provided by a pressure difference between the feed and permeate sides of the membrane. In many cases, a pressure difference between the feed and permeate sides of the membrane large enough to provide sufficient driving force for transmembrane permeation may be provided by the upstream compressor used for the condensation step. To provide additional driving force, if desired, a vacuum pump could be connected on the permeate side of the membrane, and/or the feed stream to the membrane could be subjected to additional compression. A single-stage membrane separation operation using a membrane with a selectivity of about 10 can typically remove up to about 80 or 90% of the preferentially permeating component from the feed stream and produce a permeate stream that has five times or more the concentration of that component of the feed gas. This degree of separation is adequate for many applications. If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the membrane separation step may be configured in many possible ways, including single-stage, multistage, multistep, or more complicated arrays of two or more units in series or cascade arrangements. Examples of such arrangements are described in U.S. Pat. No. 5,256,295, incorporated herein by reference in its entirety.

Figure 2:
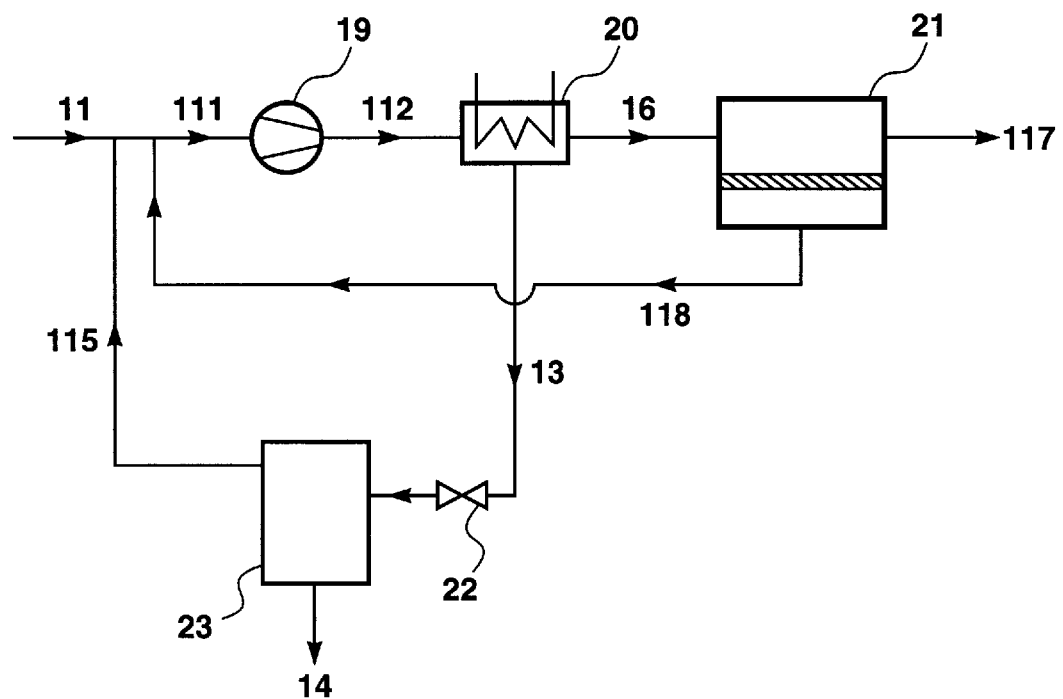
FIG. 2 is a schematic drawing of a preferred embodiment of the invention in which internal process streams are recirculated.

Turning now to the figures, FIGS. 1 and 2 show representative basic embodiments of the invention. FIG. 1 shows a process in which the condensation step is carried out, as it typically, but not necessarily, will be, by a combination of both compression and cooling, and in which the flash evaporation step is carried out, as it typically, but not necessarily, will be, by pressure reduction. Referring now to this figure, feed stream, 11, contains chlorine and other gases, such as oxygen, nitrogen, hydrogen, carbon dioxide, or light hydrocarbons. The stream passes through compressor, 19, which produces compressed stream, 12. Stream 12 then passes through heat exchanger or chiller, 20, to lower the temperature, the combination of compression and cooling resulting in the formation of a raw condensed stream, 13, containing liquefied chlorine and other dissolved or condensed gases, and an uncondensed stream, 16, still containing some chlorine. The condensed stream or condensate, 13, then passes through expansion valve, 22, thereby reducing the pressure, and into flash tank, 23. The resulting volume of gas that is generated contains the lower-boiling component, plus some chlorine. It should be noted that no destination for the flashed gas stream, 15, is indicated in FIG. 1, and that the invention encompasses both embodiments in which the flashed gas is recirculated and embodiments in which it is not.

The liquid product, which has now been twice enriched in chlorine, is withdrawn as chlorine product stream, 14. No destination for this stream is indicated in the figure. Typically, it may be sold, sent for further processing, or used or reused on site.

Stream 14 as it emerges from the flash tank is liquid, but may be allowed to vaporize and be withdrawn from the process as a gaseous product. This may be desirable if the product is to be transported or stored, for example. Furthermore, allowing the liquid to vaporize provides cooling that may be used in the condensation section by appropriate placement of heat exchangers.

The uncondensed stream, 16, is fed to a membrane separation unit, 21. The membrane unit produces two streams, a chlorine-depleted residue stream, 17, and a chlorine-enriched permeate stream, 18. No destination for either stream is indicated on the figure, and the scope of the invention includes any subsequent treatments or uses of these streams. Typically, but not necessarily, residue stream 17 passes to a final treatment step, such as scrubbing with caustic soda or pressure swing adsorption.

For simplicity, the condenser or chiller in FIG. 1 is identified by a single box, 20, from which the condensate liquid and remaining gas are shown emerging as discrete streams. It will be appreciated that, in practice, the condenser will often comprise a chiller, which produces a gas/liquid mixture, and a phase separator, in which the phases are separated and from which they are withdrawn as discrete streams.

Turning now to FIG. 2, this shows an embodiment of the invention in which recirculation of both the membrane permeate stream and the flashed gas stream is practiced. This is the most preferred arrangement of the process, because only a chlorine product stream and a relatively clean residue stream exit the process. Where the figure corresponds to FIG. 1, the same reference numbers with the same meanings are used. In FIG. 2, feed stream, 11, is combined with recirculating flashed gas stream 115 and membrane permeate stream 118 before compression in compressor, 19. Compressed stream 112 passes into cooling system 20, producing stream 16 and 13 as in FIG. 1. The flash step produces liquid product stream 14 and gas stream 115. The membrane separation step produces residue stream, 117 and permeate stream, 118.

In FIG. 2, both of the streams recirculated to the condensation step are shown as returned to mix with the feed stream, forming stream 111, upstream of the compressor, 19. Alternatively, these streams could be recompressed separately and returned for mixing with the raw purge gas after compressor, 19, but upstream of condenser, 20.

It will be appreciated by those of skill in the art that other components and operations not shown in the schematic figures may be incorporated into the process train within the scope of the invention. For example, as mentioned above, care must be taken to keep mixtures of chlorine, hydrogen and oxygen below the lower explosion limit based on hydrogen content. In the process of the invention, therefore, it may be required to dilute the gas stream with air at points along the process train to keep the hydrogen concentration below the 4% limit. Typically, dilution may be needed after the condensation step or steps. Alternatively or in addition, gas may be added after valve 22 in FIG. 2. The addition of air or other non-condensable gas at this point will facilitate stripping of carbon dioxide in the overhead flash gas.

In parent application Ser. No. 08/780,868, Now U.S. Pat. No. 5,755,855, various opportunities for heat integration within the process are discussed. In principle at least, such opportunities are available in the treatment of chlorine-containing streams according to the present invention. However, the corrosive nature of the streams involved raises cost and safety issues. Also, it is expected that the process of the invention will be widely used in electrolytic production of chlorine, where the streams to be treated by the process have a high chlorine content, so that the cooling capacity remaining in the comparatively small permeate and residue streams after liquefaction of the chlorine is small. Thus, heat integration of the type described in the parent application is not preferred in this case. A more attractive opportunity, at least in specific circumstances, is, as discussed above, to vaporize the liquid chlorine product and used the cooling produced by evaporation for cooling the incoming raw gas. An example of such a circumstance is that the chlorine is to be used on-site in a gas-phase reaction to manufacture another product, such as ethylene dichloride.

Some representative, non-limiting separations for which the process of the invention is suited are given in Table 1.

TABLE 1

| Process producing gas stream to be treated | Higher-boiling point component(s) of stream and boiling point (°C.) | | Lower-boiling point component(s) of stream and boiling point (°C.) | |
|---|---|---|---|---|
| Chlorine manufacture by brine electrolysis — raw gas treatment | Chlorine | −34 | Nitrogen<br>Oxygen<br>Carbon dioxide | −196<br>−183<br>−78 |
| Chlorine manufacture by brine electrolysis — tail gas or sniff gas treatment | Chlorine | −34 | Nitrogen<br>Oxygen<br>Carbon dioxide | −196<br>−183<br>−78 |

TABLE 1-continued

| Process producing gas stream to be treated | Higher-boiling point component(s) of stream and boiling point (°C.) | | Lower-boiling point component(s) of stream and boiling point (°C.) | |
|---|---|---|---|---|
| Metal production by metal chloride electrolysis | Chlorine HCl | −34 −85 | Nitrogen Oxygen Carbon dioxide | −196 −183 −78 |
| Titanium dioxide production by chlorination of rutile | Chlorine HCl | −34 −85 | Nitrogen Oxygen Carbon dioxide | −196 −183 −78 |
| Ethylene dichloride production | Chlorine HCl | −34 −85 | Ethylene Ethane Methane | −103 −89 −161 |

The invention is now illustrated in further detail by specific examples. These examples are intended to further clarify the invention, and are not intended to limit the scope in any way.

EXAMPLES

Example 1
Ethylene-Propylene-Diene (EPD) Membrane

An asymmetric, microporous poly(vinylidene fluoride) [PVDF] support membrane was prepared. The support membrane was dip-coated in a solution of 2.2 wt % ethylene-propylene-diene terpolymer (EPD), (Scientific Polymer Products, Inc.), in toluene at 1 ft/min, then dried in an oven at 60° C. for 20 minutes. The resulting membrane was cut into 12.6-cm² stamps, and tested using a gas mixture of about 4.5% chlorine in nitrogen at a feed temperature of 23° C. The stamps were mounted in a test cell and subjected to permeation experiments. Measurements were made at three feed pressures, hence at three chlorine partial pressures, the permeate side of the cell being maintained at atmospheric pressure in all cases. The stage-cut, defined as a ratio of permeate flow rate to feed flow rate, was maintained at less than 1%. During each test, the feed, permeate, and residue compositions were analyzed by gas chromatography (GC). The pressure-normalized fluxes of chlorine and nitrogen and the chlorine/nitrogen selectivity were calculated using an in-house computer program. Results are shown in Table 2.

TABLE 2

| Feed Pressure | Chlorine Partial Pressure | Pressure-Normalized Flux × $10^6$ (cm³/cm² · s · cmHg) | | Chlorine/Nitrogen Selectivity |
|---|---|---|---|---|
| (psia) | (psia) | Chlorine | Nitrogen | (−) |
| 65 | 2.9 | 28 | 1.5 | 18 |
| 115 | 5.3 | 26 | 1.2 | 21 |
| 165 | 7.6 | 31 | 1.3 | 23 |

Example 2
Ethylene-Propylene Copolymer (EPM) Membrane

Membranes were prepared according to the general procedure of Example 1, using a solution of 2 wt % ethylene-propylene copolymer (EPM), (Scientific Polymer Products, Inc.), in cyclohexane. The ethylene-propylene copolymer composite membrane was cut into 12.6-cm² stamps. The stamps were mounted in a test cell and subjected to permeation experiments using the same general procedure as in Example 1. Results are shown in Table 3.

TABLE 3

| Feed Pressure | Chlorine Partial Pressure | Pressure-Normalized Flux × $10^6$ (cm³/cm² · s · cmHg) | | Chlorine/Nitrogen Selectivity |
|---|---|---|---|---|
| (psia) | (psia) | Chlorine | Nitrogen | (−) |
| 65 | 2.6 | 12 | 1.1 | 12 |
| 115 | 4.6 | 38 | 1.0 | 38 |
| 165 | 6.9 | 48 | 1.2 | 40 |

Example 3
Silicone Rubber Membrane

Membranes were prepared according to the general procedure of Example 1, using a solution of 15 wt % crosslinked silicone rubber, (Wacker Adhesive Inc.) in isooctane. Crosslinking was accomplished by mixing a low molecular weight silicone oligomer with a peroxide-based crosslinking agent and a chloroplatinic acid-based catalyst. The silicone rubber composite membrane was cut into 12.6-cm² stamps. The stamps were mounted in a test cell and subjected to permeation experiments using the same general procedure as in Example 1. Results are shown in Table 4.

TABLE 4

| Feed Pressure | Chlorine Partial Pressure | Pressure-Normalized Flux × $10^6$ (cm³/cm² · s · cmHg) | | Chlorine/Nitrogen Selectivity |
|---|---|---|---|---|
| (psia) | (psia) | Chlorine | Nitrogen | (−) |
| 65 | 2.5 | 190 | 5.9 | 32 |
| 115 | 4.5 | 190 | 6.0 | 32 |
| 165 | 6.9 | 160 | 5.9 | 27 |

Example 4

Permeation Tests with a Membrane Module

Four spiral-wound membrane modules were constructed using materials found to be resistant to chlorine. The modules were rolled using a silicone rubber/PVDF composite membrane prepared as in Example 3, with a 20-μm-thick silicone rubber selective layer. The modules were 12-inches long and 2 inches in diameter. The modules were subjected to integrity tests based on their oxygen/nitrogen selectivity. Two modules were found to be defective; the remaining two modules were used for permeation tests, following the same general procedures as in Example 1. The results are shown in Table 5.

TABLE 5

| Feed Pressure | Temp. | Feed Chlorine Content | Feed Chlorine Activity | Pressure-Normalized Flux × $10^6$ (cm³/cm² · s · cmHg) | | Chlorine/Nitrogen Selectivity |
|---|---|---|---|---|---|---|
| (psig) | (°C.) | (%) | (−) | Chlorine | Nitrogen | (−) |
| 50 | 23 | 10.6 | 0.06 | 80 | 2.5 | 32 |
| 100 | 23 | 10.6 | 0.11 | 83 | 2.5 | 33 |
| 130 | 23 | 10.6 | 0.13 | 110 | 2.6 | 42 |
| 50 | 23 | 19.5 | 0.11 | 57 | 1.7 | 34 |
| 100 | 23 | 21.3 | 0.21 | 78 | 2.3 | 34 |
| 125 | 23 | 21.3 | 0.26 | 110 | 2.9 | 38 |

TABLE 5-continued

| Feed Pressure (psig) | Temp. (°C.) | Feed Chlorine Content (%) | Feed Chlorine Activity (-) | Pressure-Normalized Flux x $10^6$ ($cm^3/cm^2 \cdot s \cdot cmHg$) Chlorine | Pressure-Normalized Flux x $10^6$ ($cm^3/cm^2 \cdot s \cdot cmHg$) Nitrogen | Chlorine/ Nitrogen Selectivity (-) |
|---|---|---|---|---|---|---|
| 25 | 23 | 100 | 0.35 | 260 | — | — |
| 20 | 15 | 100 | 0.30 | 530 | — | — |

Membrane Area: 1,340 $cm^2$; Stage-Cut: <2%.

Example 5

A spiral-wound membrane module containing a silicone rubber membrane was tested under field conditions for a 10-day period. The average feed compositions throughout the 10-day test period are as follows:

| | |
|---|---|
| Chlorine | 14.2 mol % |
| Carbon Dioxide | 4.9 mol % |
| Hydrogen | 3.4 mol % |
| Nitrogen | 52.4 mol % |
| Oxygen | 25.1 mol % |

Figure 3:
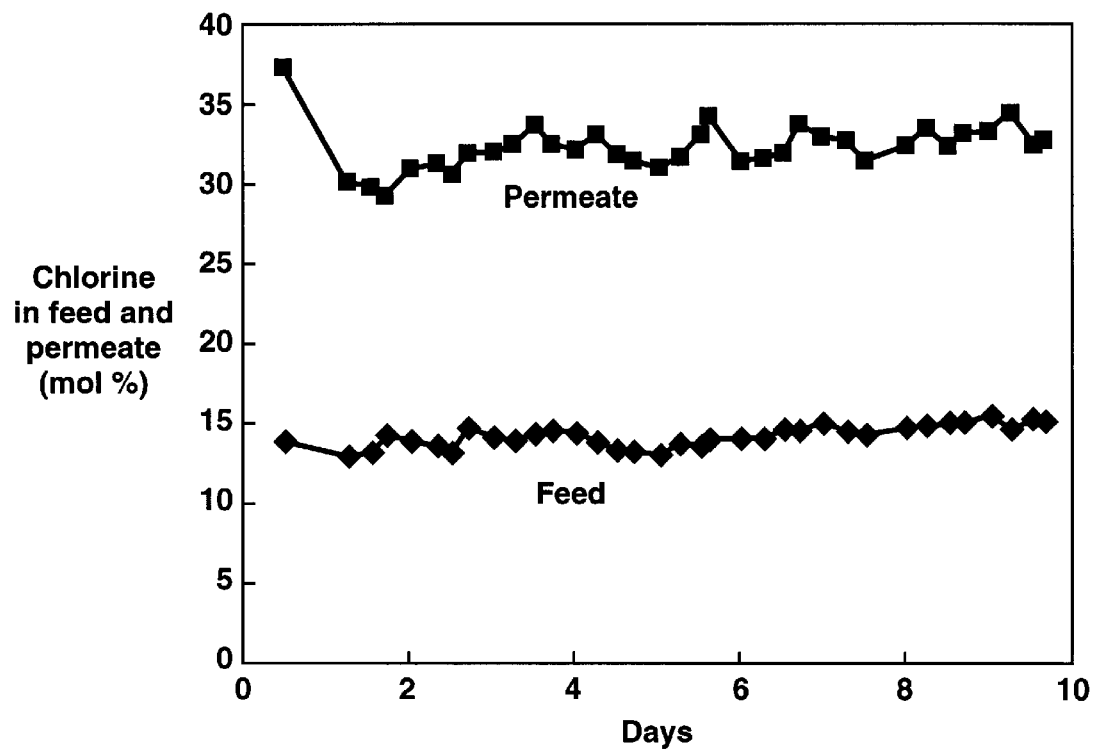
FIG. 3 is a plot of sample feed chlorine concentration and permeate chlorine concentration during a prolonged test of a spiral-wound module containing a silicone rubber membrane.
Figure 4:
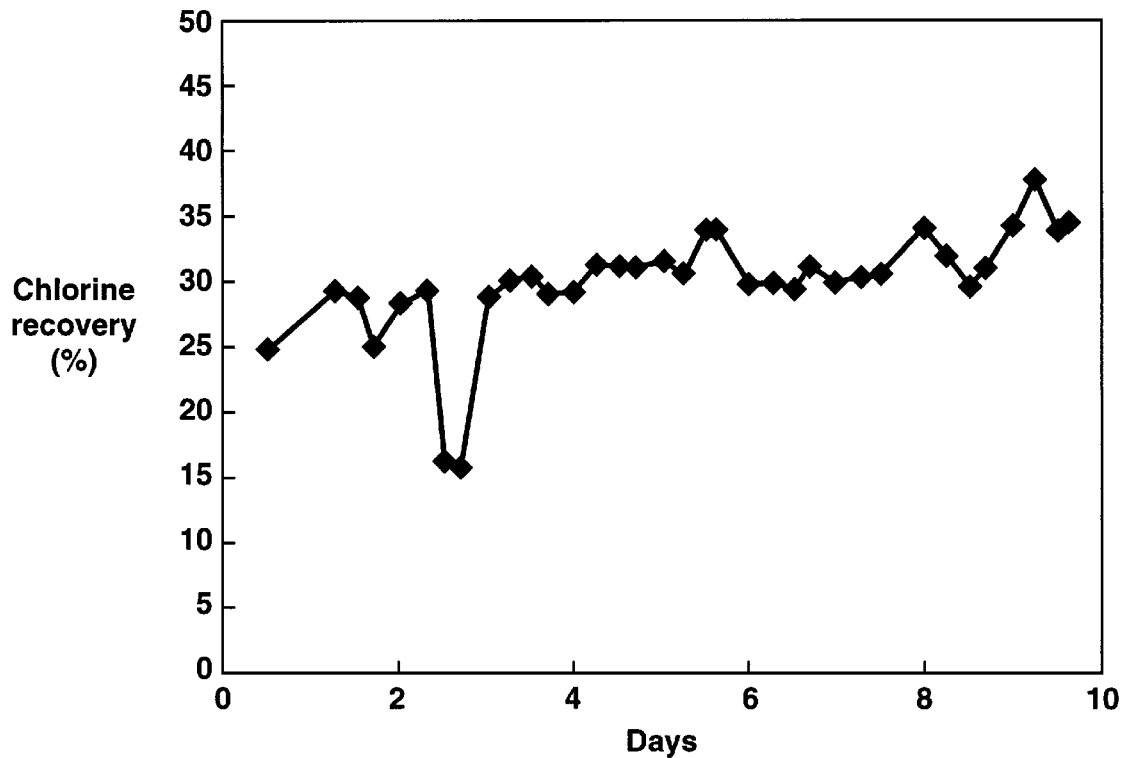
FIG. 4 is a plot of chlorine recovery achieved during a prolonged test of a spiral-wound module containing a silicone rubber membrane.

The feed stream was at a pressure of 101 psig and a temperature of –38° C., and had a flow rate through the module of 28 scfm. The feed and permeate streams were sampled and analyzed on a regular basis. The results are shown graphically in FIG. 3. As can be seen, the concentration of chlorine in the permeate remained at about 30–35% over the duration of the test. FIG. 4 shows the data plotted in terms of chlorine recovery. As can be seen, the module achieved about 30% chlorine recovery over the duration of the test.

Example 6

A computer calculation was performed with a modeling program, ChemCad III (ChemStations, Inc., Houston, Tex.), to illustrate chlorine recovery from a chlor-alkali facility by the process of the invention. The feed stream was assumed to be 93.8% chlorine, 1% hydrogen, 4% nitrogen, 1% oxygen, and 0.3% carbon dioxide; and to have a flow rate of about 100,000 kg/day.

A process design as in FIG. 2, in which both the membrane permeate stream 118 and the overhead stream 115 from the flash tank are recirculated, was assumed. The feed was assumed to be compressed to 100 psia by compressor 19 and cooled to –38° C. by chiller 20.

The process was assumed to use a silicone rubber membrane, exhibiting the following fluxes under the operating conditions of the process:

| | |
|---|---|
| Chlorine | 800 x $10^{-6}$ $cm^3(STP)/cm^2 \cdot sec \cdot cmHg$ |
| Hydrogen | 150 x $10^{-6}$ $cm^3(STP)/cm^2 \cdot sec \cdot cmHg$ |
| Nitrogen | 80 x $10^{-6}$ $cm^3(STP)/cm^2 \cdot sec \cdot cmHg$ |
| Oxygen | 170 x $10^{-6}$ $cm^3(STP)/cm^2 \cdot sec \cdot cmHg$ |
| Carbon Dioxide | 800 x $10^{-6}$ $cm^3(STP)/cm^2 \cdot sec \cdot cmHg$ |

The results of the calculations are shown in Table 6, where the stream numbers correspond to FIG. 2. As can be seen, the process yields 100,353 kg/day of liquid chlorine (stream 14), and the chlorine lost in the residue stream (stream 117) is under 10 kmol/day.

TABLE 6

| | Stream 11 | Stream 111 | Stream 112 | Stream 13 | Stream 14 | Stream 115 | Stream 16 | Stream 117 | Stream 118 |
|---|---|---|---|---|---|---|---|---|---|
| Component/Parameter | | | | | | | | | |
| Molar Flow Rate (kmol/day) | 1,517 | 2,234 | 2,234 | 1,553 | 1,417 | 136.6 | 1,062 | 481.7 | 580.4 |
| Mass Flow Rate (kg/day) | 103,253 | 135,045 | 135,045 | 109,608 | 100,353 | 9,255 | 36,437 | 13,900 | 22,538 |
| Temperature (°C.) | 40 | 17 | 260 | –38 | –5 | –11 | –38 | –41 | –41 |
| Pressure (psia) | 14 | 14 | 100 | 95 | 50 | 14 | 95 | 90 | 14 |
| Component (mol %) | | | | | | | | | |
| Chlorine | 93.7 | 75.6 | 75.6 | 99.0 | 99.7 | 91.7 | 14.3 | 2.0 | 24.5 |
| Hydrogen | 1.0 | 1.7 | 1.7 | — | — | 0.04 | 3.5 | 3.1 | 3.8 |
| Nitrogen | 4.0 | 14.0 | 14.0 | 0.3 | — | 2.8 | 57.4 | 75.1 | 42.7 |
| Oxygen | 1.0 | 8.2 | 8.2 | 0.3 | 0.02 | 3.6 | 24.2 | 19.7 | 27.9 |
| Carbon Dioxide | 0.25 | 0.56 | 0.56 | 0.38 | 0.24 | 1.8 | 0.63 | 0.09 | 1.1 |

Membrane Area = 280 $m^2$
Theoretical Horsepower = 211 hp
— = less than 0.01

Example 7 (Not in Accordance With the Invention)

The calculations of Example 6 were repeated, except that the membrane step was assumed to be eliminated from the process design. The same pressure and temperature conditions, that is compression to 100 psia and cooling to –38° C., were assumed.

The results of the calculations are shown in Table 7, where the stream numbers correspond to FIG. 2.

In this case, the process yields 96,591 kg/day of liquid chlorine (stream 14), compared with 100,353 kg/day according to the process of the invention, and the chlorine lost in the off-gas stream from the condenser (stream 16) is about 62 kmol/day compared with under 10 kmol/day in Example 6. In other words, the process of the invention achieves about a 4% increase in productivity compared with condensation without membrane separation.

TABLE 7

| | Stream 11 | Stream 111 | Stream 112 | Stream 13 | Stream 14 | Stream 115 | Stream 16 | Stream 117 | Stream 118 |
|---|---|---|---|---|---|---|---|---|---|
| Component/Parameter | | | | | | | | | |
| Molar Flow Rate (kmol/day) | 1,517 | 1,621 | 1,621 | 1,467 | 1,363 | 104.1 | 432.1 | n/a | n/a |
| Mass Flow Rate (kg/day) | 103,253 | 110,301 | 110,301 | 103,639 | 96,591 | 7,048 | 14,687 | | |
| Temperature (°C.) | 40 | 37 | 284 | −38 | −5 | −11 | −38 | | |
| Pressure (psia) | 14 | 14 | 100 | 95 | 50 | 14 | 95 | | |
| Component (mol %) | | | | | | | | | |
| Chlorine | 93.7 | 93.6 | 93.6 | 99.2 | 99.8 | 91.7 | 14.3 | | |
| Hydrogen | 1.0 | 0.9 | 0.9 | — | — | 0.1 | 3.5 | | |
| Nitrogen | 4.0 | 4.0 | 4.0 | 0.3 | 0.01 | 3.9 | 64.8 | | |
| Oxygen | 1.0 | 1.1 | 1.1 | 0.2 | 0.02 | 3.1 | 17.0 | | |
| Carbon Dioxide | 0.25 | 0.31 | 0.31 | 0.23 | 0.16 | 1.2 | 0.38 | | |

Membrane Area = 0 m$^2$
Theoretical Horsepower = 162 hp
— = less than 0.01

Example 8

The calculations of Example 6 were repeated, except assuming that the feed is compressed to only 60 psig and cooled to only −5° C. The results of the calculations are shown in Table 8, where the stream numbers correspond to FIG. 2.

The process yields 94,473 kg/day of liquid chlorine (stream 14), and the chlorine lost in the residue stream (stream 117) is about 92 kmol/day.

TABLE 8

| | Stream 11 | Stream 111 | Stream 112 | Stream 13 | Stream 14 | Stream 115 | Stream 16 | Stream 117 | Stream 118 |
|---|---|---|---|---|---|---|---|---|---|
| Component/Parameter | | | | | | | | | |
| Molar Flow Rate (kmol/day) | 1,517 | 2,533 | 2,533 | 1,337 | 1,333 | 3.2 | 1,196 | 183.9 | 1,012 |
| Mass Flow Rate (kg/day) | 103,253 | 172,249 | 172,249 | 94,690 | 94,473 | 217.2 | 77,560 | 8,788 | 68,773 |
| Temperature (°C.) | 40 | 20 | 185 | −4 | −5 | −11 | −4 | −10 | −10 |
| Pressure (psia) | 14 | 14 | 60 | 55 | 50 | 14 | 55 | 50 | 14 |
| Component (mol %) | | | | | | | | | |
| Chlorine | 93.7 | 93.5 | 93.5 | 99.8 | 99.8 | 91.7 | 86.6 | 50.0 | 93.2 |
| Hydrogen | 1.0 | 1.1 | 1.1 | — | — | 0.7 | 2.4 | 8.2 | 1.3 |
| Nitrogen | 4.0 | 3.4 | 3.4 | 0.02 | 0.01 | 4.1 | 7.2 | 32.9 | 2.5 |
| Oxygen | 1.0 | 1.2 | 1.2 | 0.02 | 0.01 | 2.1 | 2.5 | 8.1 | 1.5 |
| Carbon Dioxide | 0.25 | 0.72 | 0.72 | 0.18 | 0.18 | 1.4 | 1.3 | 0.77 | 1.4 |

Membrane Area = 222 m$^2$
Theoretical Horsepower = 166 hp
— = less than 0.01

Example 9 (Not in Accordance With the Invention)

The calculations of Example 8 were repeated, except that the membrane step was assumed to be eliminated from the process design. The same pressure and temperature conditions, that is compression to 60 psia and cooling to −5° C., were assumed.

The results of the calculations are shown in Table 9, where the stream numbers correspond to FIG. 2.

In this case, the process yields 57,672 kg/day of liquid chlorine (stream 14), compared with 94,473 kg/day according to the process of the invention, and the chlorine lost in the off-gas stream from the condenser (stream 16) is about 610 kmol/day compared with about 92 kmol/day in Example 8. In other words, the process of the invention achieves about a 160% increase in productivity compared with condensation without membrane separation.

TABLE 9

|  | Stream 11 | Stream 111 | Stream 112 | Stream 13 | Stream 14 | Stream 115 | Stream 16 | Stream 117 | Stream 118 |
|---|---|---|---|---|---|---|---|---|---|
| Component/Parameter | | | | | | | | | |
| Molar Flow Rate (kmol/day) | 1,517 | 1,519 | 1,519 | 815.4 | 813.7 | 1.7 | 703.6 | n/a | n/a |
| Mass Flow Rate (kg/day) | 103,253 | 103,370 | 103,370 | 57,790 | 57,672 | 117.1 | 45,582 | | |
| Temperature (°C.) | 40 | 40 | 215 | −4 | −5 | −11 | −4 | | |
| Pressure (psia) | 14 | 14 | 60 | 55 | 50 | 14 | 55 | | |
| Component (mol %) | | | | | | | | | |
| Chlorine | 93.7 | 93.8 | 93.8 | 99.9 | 99.9 | 91.8 | 86.7 | | |
| Hydrogen | 1.0 | 1.0 | 1.0 | — | — | 0.7 | 2.2 | | |
| Nitrogen | 4.0 | 4.0 | 4.0 | 0.02 | 0.01 | 5.2 | 8.6 | | |
| Oxygen | 1.0 | 1.0 | 1.0 | 0.02 | 0.01 | 1.8 | 2.1 | | |
| Carbon Dioxide | 0.25 | 0.25 | 0.25 | 0.06 | 0.06 | 0.49 | 0.47 | | |

Membrane Area = 0 $m^2$
Theoretical Horsepower = 106 hp
— = less than 0.01

I Claim:

1. A process for separating chlorine from a gas mixture containing chlorine and at least one component of lower boiling point; said process comprising the following steps:

(a) compressing said gas mixture to a pressure no higher than about 1,000 psig;

(b) cooling said gas mixture to a temperature no lower than about −100° C.; steps (a) and (b) causing partial condensation of said gas mixture and resulting in a condensed portion enriched in chlorine and an uncondensed portion depleted in chlorine;

(c) flashing said condensed portion to at least partially remove additional amounts of said at least one component of lower boiling point as a flash stream thereby creating a more-enriched chlorine product stream;

(d) treating said uncondensed portion in a membrane separation unit, containing a membrane selective for chlorine over said at least one component of lower boiling point, thereby creating a permeate stream enriched in chlorine compared with said uncondensed portion and a residue stream depleted in chlorine compared with said uncondensed portion;

(e) recirculating said permeate stream to said step (a); (f) recirculating said flash stream to said step (a).

2. The process of claim 1, wherein the pressure is no greater than about 500 psig.

3. The process of claim 1, wherein the temperature is no lower than about −40° C.

4. The process of claim 1, wherein the temperature is no lower than about −20° C.

5. The process of claim 1, wherein said step (b) is carried out in multiple cooling stages to produce at least two separate condensates, of which at least one of said separate condensates is used as said condensed portion.

6. The process of claim 1, wherein said step (c) is carried out by reducing the pressure of said condensed portion.

7. The process of claim 1, wherein said step (c) is carried out by increasing the temperature of said condensed portion.

8. The process of claim 1, wherein said step (c) is carried out in multiple flashing stages to produce at least two separate flash streams, of which at least one is subjected to said step (f).

9. The process of claim 1, wherein said membrane comprises silicone rubber.

10. The process of claim 1, wherein said membrane comprises an inorganic membrane.

11. The process of claim 1, wherein said membrane comprises a carbon membrane.

12. The process of claim 1, wherein said membrane has a selectivity for chlorine over nitrogen of at least about 10.

13. The process of claim 1, wherein said at least one component of lower boiling point is nitrogen.

14. The process of claim 1, wherein said at least one component of lower boiling point is oxygen.

15. The process of claim 1, wherein said at least one component of lower boiling point is carbon dioxide.

16. The process of claim 1, wherein said at least one component of lower boiling point is hydrogen.

17. The process of claim 1, wherein said at least one component of lower boiling point is selected from the group consisting of methane, ethane and ethylene.

18. The process of claim 1, further comprising passing said residue stream to a scrubbing step.

* * * * *